United States Patent
Rose et al.

(10) Patent No.: US 6,284,359 B1
(45) Date of Patent: *Sep. 4, 2001

(54) STARCH-BASED CORE PRODUCTS FOR USE IN ROLLED PAPER GOODS

(75) Inventors: Richard R. Rose, Amelia Island, FL (US); Beth C. Tormey, Frenchtown; Paul A. Altieri, Belle Mead, both of NJ (US)

(73) Assignee: National Starch and Chemical Company Investment Holding Corporation, Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,174

(22) Filed: Sep. 29, 1997

Related U.S. Application Data

(63) Continuation-in-part of application No. 08/795,535, filed on Feb. 5, 1997, now abandoned, and a continuation-in-part of application No. 08/537,415, filed on Oct. 30, 1995, now abandoned, which is a continuation-in-part of application No. 08/069,632, filed on Jun. 1, 1993, now abandoned, and a continuation-in-part of application No. 08/440,165, filed on May 12, 1995, now Pat. No. 5,849,233, which is a continuation-in-part of application No. 08/338,059, filed on Nov. 10, 1994, now abandoned, which is a continuation of application No. 07/796,739, filed on Nov. 25, 1991, now abandoned.

(51) Int. Cl.$^7$ ............................. B32B 1/08; B32B 9/00; B32B 9/04; B32B 9/06
(52) U.S. Cl. .................... 428/314.4; 428/35.6; 428/36.9; 428/304.4; 428/317.9; 428/318.4; 428/323; 428/532; 428/537.5; 428/906; 264/51; 264/176.1; 264/209.1; 264/211; 264/211.1; 521/56; 521/79; 521/84.1; 521/88; 521/916
(58) Field of Search .................. 428/906, 537.5, 428/532, 323, 402, 304.4, 314.4, 316.6, 35.6, 36.5, 36.9; 206/389; 264/176.1, 209.1, 211, 211.11; 521/79, 82, 84.1, 88, 916; 106/122, 210

(56) References Cited

U.S. PATENT DOCUMENTS

| 4,863,655 | 9/1989 | Lacourse et al. | 264/53 |
| 5,035,930 | 7/1991 | Lacourse et al. | 428/35.6 |
| 5,043,196 * | 8/1991 | Lacourse et al. | 428/35.6 |
| 5,153,037 | 10/1992 | Altieri | 428/35.6 |
| 5,248,702 | 9/1993 | Neumann et al. | 521/84.1 |
| 5,272,181 | 12/1993 | Boehmer et al. | 521/84.1 |
| 5,288,318 | 2/1994 | Mayer et al. | 106/213 |
| 5,288,765 | 2/1994 | Bastioli et al. | 521/84.1 |
| 5,314,754 | 5/1994 | Knight | 428/532 |
| 5,360,830 | 11/1994 | Bastioli et al. | 521/84.1 |
| 5,393,804 | 2/1995 | George et al. | 523/128 |
| 5,412,005 | 5/1995 | Bastioli et al. | 524/47 |
| 5,437,924 | 8/1995 | Decker et al. | 428/318.4 |
| 5,849,233 * | 12/1998 | Altieri et al. | 264/211.11 |

FOREIGN PATENT DOCUMENTS 0544 234 * 6/1993 (EP).

* cited by examiner

*Primary Examiner*—Vivian Chen
(74) *Attorney, Agent, or Firm*—Laurelee Duncan, Esq.; Eugene Zagarella, Esq.

(57) ABSTRACT

A biodegradable, water dispersible shaped core product useful in winding or rolling and storage of paper goods is provided by extruding starch which has a particle size of 800 to 1200 microns into an expanded, closed cell starch product.

22 Claims, No Drawings

STARCH-BASED CORE PRODUCTS FOR USE IN ROLLED PAPER GOODS

This application is a continuation-in-part of application Ser. No. 08/537,415 filed Oct. 30, 1995 and now abandoned; and a continuation-in-part of application Ser. No. 08/795,535 filed Feb. 5, 1997 and now abandoned, which is a continuation-in-part of application Ser. No. 08/338,059 filed Nov. 10, 1994 and now abandoned; and a continuation-in-part of application Ser. No. 08/440,165 filed May 12, 1995, now U.S. Pat. No. 5,849,233, which is a continuation of application Ser. No. 08/069,632 filed Jun. 1, 1993 and now abandoned, which in turn is a continuation of application Ser. No. 07/796,739 filed Nov. 25, 1991 and now abandoned.

This invention relates to biodegradable, water soluble and dispersible, expanded or foamed shaped products which are extruded from starch and are particularly suited for use as the cores in the winding or rolling and storage of paper goods.

Rolled paper goods, such as toweling, tissue and wrapping papers are typically held on a wound paper core. The paper core provides structure and acts as a support for the rolled or wound paper. Emphasis on environmental concerns has made it highly desirable to use products which are either biodegradable and readily disposable or recyclable. While paper is repulpable and recyclable, the products using paper cores generally contain an adhesive or glue making it difficult to process in a repulping operation.

Starch, a readily available known biodegradable material, has been used to prepare foamed, film and other shaped products for different purposes including selected packaging applications. Some of these starch products and their uses are described in U.S. Pat. Nos. 5,035,930 and 5,043,196.

Extrusion is a well known technique, widely used in forming plastic materials into various foamed and expanded products. More recently, the extrusion of starch into expanded articles has shown increased interest as noted in the aforementioned '930 and '196 U.S. patents which disclose the extrusion of high amylose starch into low density packaging materials. Other disclosures of forming starch products by extrusion can be found in U.S. Pat. No. 5,248,702 directed to packaging fillers and in U.S. Pat. No. 5,314,754 involved with the formation of shaped products from a starch hot melt.

The biodegradable, starch-containing packaging materials known in the art are typically prepared to be water-resistant rather than water-dispersible. Furthermore, not much attention has been directed to the preparation and production of structured starch articles such as expanded core products, which require demanding properties including dimensional stability and structural strength. Thus, there remains a need for biodegradable products which are also water soluble and water dispersible and further meet the physical and structural requirements demanded in paper core applications.

SUMMARY OF THE INVENTION

The present invention provides a biodegradable, water dispersible shaped core product having good dimensional stability and structural strength properties comprising an expanded, closed cell starch product wherein the product is formed by extruding starch which has a selected particle size. More particularly, the expanded starch product of this invention is a water dispersible, shaped product made by extruding starch having a particle size of from 400 to 1500 microns.

DETAILED DESCRIPTION OF THE INVENTION

The ability to provide biodegradable, water dispersible shaped starch core products for use in the winding or rolling and storage of paper goods is the main objective of this invention. The term "core" product as used herein refers to products having relatively large configurations or shapes and includes tubes or inserts, spools and supports used for rolled paper goods such as tissues and towels and may even be used for rolling and holding other fabric materials. The core may be solid or tubular and the dimensions can vary depending on the particular use and operation in which it is being used. Generally dimensions of up to 3.0 inches or more, inner and outer diameters and lengths of up to 240" or more may be used. In the tissue application area, typical dimensions include inner diameter of about 1.5" and outer diameter of about 1.75" with a length of about 120". These dimensions as noted, depend on use and will vary, for example in the paper area depending on the winding and cutting equipment in which it is used.

The formation of shaped starch products by extrusion is becoming of more interest and has been described many times in the recent literature as noted previously. Most of the disclosures have been involved with providing shaped fillers and random or smaller packaging materials such as discrete loosefill products, sometimes called peanuts, or very small sheets. The ability to extend this processing concept to the formation of bigger or larger starch shaped products, such as cores for paper products, has not been a simple or direct extension of the known technology. This is because the chemical nature of starch is quite different from the various plastic and synthetic materials, such as styrene and polyethylene, that have been extruded into shaped products for many years. Additionally, while the rheology of starch extrusion to form smaller loosefill type products is similar in some respects to the extrusion of larger structured or core products, it is also different or lacking in other properties or aspects. Along these lines, it is noted that the extrusion of starch to produce foamed core products generally requires dies with large openings or increased cross sectional areas. This means higher throughput or feed rates to satisfy pressure, fill rates and other rheological properties needed to produce products with suitable properties. One significant variation is that of cell structure in the resulting product.

In order to provide suitable extrusion properties and particularly the needed high feed rates and threshold throughput in forming desired core starch products, it has been found that the feed starch particle size is an important factor. A significantly large and defined particle size has been found especially advantageous in providing desirable extrusion processing conditions and resulting product properties. The useful particle size is large and in a defined range of from about 400 to 1500 microns and more particularly from about 800 to 1200 microns. When using starch feed material with this defined particle size, the extrusion processing conditions including feed rate and pressure, plus needed cell structure in the formed product were more readily attainable to provide the core product of suitable characteristics.

In order to obtain the starch feed material having the necessary particle size in accordance with this invention, a method known as compact granulating, commonly referred to as chilsonating, may be used. Other methods to attain desired starch particle size may also be used provided substantially all of the starch feed material is within the prescribed size range.

Another feature which improves processing and the properties of the resulting structured starch products is the addition of a nucleating agent or salt to the starting starch feed material. This is especially helpful when dies of increased and large open areas or cross section are used and particularly improves the cell structures of the expanded product. Various nucleating agents or salts may be used in this capacity including any inorganic, water soluble salt or mixtures thereof and especially an alkali metal or alkaline earth metal salt such as sodium sulfate and sodium chloride. Other nucleating agents such as microtalc can be used but the alkali metal or alkaline earth metal salts are preferred. The amount of nucleating agent used will depend on particular processing conditions and desired extruded product dimensions, with at least 1%, more particularly from 1 to 8% and preferably from 1 to 6% by weight of nucleating agent, based on the weight of starch in the feed composition, being used. In general, the higher amounts of nucleating agent have been found very beneficial when using large die openings needed to produce the structured or core starch products. It is further noted that the nucleating agent or salt can be added to the feed starch or in certain circumstances may be present as residual salt or ash content in the already prepared starch. The combination of defined starch particle size and the addition of nucleating agent, as defined herein, has been found to be especially advantageous in producing the core foam starch products in accordance with this invention.

The starting estarch material useful in this invention may be any of several starches, native or converted. Such starches include those derived from any plant source including corn, potato, wheat, sago, tapioca, waxy maize, sorghum and high amylose starch such as high amylose corn, i.e., starch having at least 40% and more particularly at least 65% amylose content by weight, etc. Starch flours may also be used as a starch source. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

Modified starches are particularly useful in this invention. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and half-esters of dicarboxylic acids, particularly the alkenyisuccinic acids; ethers, such as the hydroxyethyl and hydroxypropyl starches and starches reacted with hydrophobic cationic epoxides; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, edited by Roy L. Whistler, et al., Chapter X; Starch Derivations: Production and Uses by M. W. Rutenberg, et al., Academic Press, Inc. 1984.

One modification of the starches used in this invention that is especially useful is the etherification with alkylene oxides, particularly those containing 2 to 6, preferably 2 to 4 carbon atoms. Ethylene oxide, propylene oxide and butylene oxide are exemplary compounds that are useful in etherifying the starting starch materials, with propylene oxide being especially preferred. Varying amounts of such compounds may be used depending on the desired properties and economics. Generally, from 2 to 15% or more and preferably, 2 to 10%, by weight, based on the weight of starch will be used.

Another modification of the starches that is especially useful in this invention is a starch ester prepared from an organic acid anhydride having a hydrophobic group such as dodecenyl succinic anhydride. More particularly, the hydrophobic group is a hydrocarbon group such as alkyl, alkenyl, aralkyl or aralkenyl, having 2 to 20 carbons, preferably 5 to 18 and more preferably 8 to 12 carbons. Generally, the starch will be treated with 2 to 60% and preferably 5 to 20% by weight of the anhydride, based on the weight of starch.

In a preferred embodiment, the starch material is a high amylose starch, i.e., one containing at least 40%, by weight, and more preferably at least 65%, by weight, of amylose. Further preferred are the high amylose starches modified by etherifiction with alkylene oxides, as described above.

Blends of two or more of the starch starting materials may be used as well as additive or synthetic compounds to improve properties such as strength, flexibility, color, etc. Compounds such as polyvinyl alcohol, ethylene vinyl alcohol, polyvinyl acetate, poly (ethylene vinyl acetate), monoglycerides, sty rene acrylate resins are typical additives which may be used. These additives may be used in any amount that will effectively satisfy the desired property, provided the extrusion of the starch and the overall properties of the expanded product are suitable. Generally, up to about 50% by weight of such additives, and preferably up to about 10% by weight, may be used.

The expanded shaped products of this invention are prepared using an extrusion process. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder may be made as desired in accordance with conventional design practices. A further description of extrusion and typical design variations can be found in "Encyclopedia of Polymer Science and Engineering", Vol. 6, 1986, pp. 571 to 631.

In carrying out the extrusion process, temperatures in the extruder will vary depending on the particular material, desired properties and application. They can generally range from about 100 to 250° C. and preferably when extruding high amylose starch will range from about 150 to 210° C. The total moisture content of the starch in the extruder, i.e., moisture present in the inlet fed starch plus water added during processing, will be about 25% or less by weight, based on the weight of starch. More particularly, the total moisture content of the starch will range from about 10 to 25% and preferably from about 15 to 21%.

Various dies and die configurations may be used in the extruder and extrusion process with an annular or tubular die being one suitable type. Upon exiting the extruder, the expanded starch product can be cut to a desired length using techniques known to those skilled in the art.

The product emerging from the extruder and processing operations is an expanded, closed cell material of relatively low to intermediate density, with good flexibility or rigidity as well as dimensional stability and structural strength. Additionally, the extruded core product of this invention also possesses various property characteristics that help it withstand the different environmental and operation conditions, such as high speed winding operations, to which it will be exposed.

The product will also be biodegradable or substantially biodegradable depending on whether it comprises all starch or if it includes other components, the nature of such components. Biodegradability has become a desired feature of many products because of the environmental problems associated with waste disposal. The term "biodegradable" as used herein refers to the susceptibility of a substance to decomposition by living things (organisms/microorganisms) and/or natural environmental factors, e.g., the ability of compounds to be chemically broken down by bacteria, fungi, molds and yeast. Besides biodegradability, the extruded core product desirably will be water soluble upon direct contact with water so it can be readily disposable.

The starch material that is processed through the extruder emerges as an expanded, foam material because of the nature of the material and formulation as well as the moisture content and the general extruder operating conditions. This foamed product may be expanded by amounts of up to 16 times or more from its original size and will have a characteristic closed cell structure. The uniform, closed cell structure of the expanded product with its characteristic tiny bubble formation helps to give it desired properties. A close cell structure is defined as one having largely nonconnecting cells, as opposed to open cells which are largely interconnecting or defined as two or more cells interconnected by broken, punctured or missing cell walls. The tiny bubble formation generally results in a small cell size of typically about 100 to 1200 microns.

The bulk density of the product will be from about 2 to 16 lb/ft$^3$ and preferably from about 3 to 10 lb/ft$^3$. The bulk density can be determined by the volume deplacement method described by M. Hwang and K. Hayakawa in "Bulk Densities of Cookies Undergoing Commercial Baking Processes", Journal of Food Science, Vol. 45, 1980, pp. 1400–1407. This method is further described in U.S. Pat. No. 5,043,196.

The invention is further illustrated by the following examples with all parts and percentages given by weight and all temperatures in degrees Celsius unless otherwise noted.

EXAMPLE 1

Several starch samples were extruded into foamed cores using a Werner and Pfleiderer twin screw co-rotating extruder, model ZSK 30 having a tubular die with a 2" O.D. and 1.7" I.D. The first material extruded was high amylose starch (Hylon VII, a high amylose corn starch product of National Starch and Chemical Company having about 70% amylose content by weight) hydroxypropylated with about 7% of propylene oxide. The starch feed had particle size ranging from about 840 to 1190 microns and was obtained using a compact granulation process. The feed contained about 2.5% by weight of microtalc as nucleating agent.

The extrusion processing conditions included total moisture content of 17.5%, a feed rate of 47.1 kg/hr (104 lb/hr), a screw speed of 500 rpm and temperature at the die of 1 80° C.

The foamed starch core product exited the extruder and was cut to a desired length. The extruded core products were closed cell starch foam products having suitable properties including dimensional stability, strength and flexibility for the intended use with tissue paper products. They also rapidly dispersed in the presence of water with moderate agitation.

EXAMPLE 2

Several additional starch samples were extruded into foamed core products as in Example 1. The feed materials included 1) hydroxypropylated high amylose starch as in Example 1 and 2.5% microtalc with the addition of 8% of polyvinyl alcohol, 2) a 50/50 blend of the hydroxypropylated high amylose starch as in Example 1 and a starch modified with dodecenyl succinic anhydride with 2.5% microtalc and 3) the hydroxypropylated high amylose starch as in Example 1 with 5.2% ash (Na$_2$SO$_4$).

All or the prepared products were closed cell starch foam products and had suitable properties needed for core products used in paper applications.

What is claimed is:

1. A biodegradable, water dispersible shaped core product comprising an expanded, closed cell starch product which is formed by extruding starch having a particle size of from about 800 to 1200 microns.

2. The product of claim 1 wherein the starch has amylose content of at least 40% based on the weight of the starch.

3. The product of claim 1 wherein the starch is selected from the group consisting of corn, potato, wheat, tapioca, waxy maize and high amylose corn.

4. The product of claim 3 wherein the starch is a modified starch.

5. The product of claim 4 wherein the starch is modified with 2 to 15% by weight of alkylene oxide containing 2 to 6 carbon atoms.

6. The product of claim 5 wherein the starch has amylose content of at least 40% based on the weight of the starch.

7. The product of claim 5 wherein the starch has amylose content of at least 65% based on the weight of the starch.

8. The product of claim 3 wherein the product has a bulk density of from about 2 to 16 lb/ft.

9. The product of claim 8 wherein the starch is a modified starch.

10. The product of claim 9 wherein the starch has amylose content of at least 40% based on the weight of the starch.

11. The product of claim 10 wherein the starch is modified with 2 to 15% by weight of alkylene oxide containing 2 to 6 carbon atoms.

12. The product of claim 11 wherein the starch contains from 1 to 8% by weight of a nucleating agent selected from the group consisting of inorganic salts and talc.

13. A rolled paper product comprising paper wound onto the starch core product of claim 10.

14. The product of claim 1 wherein the starch contains from 1 to 8% by weight of a nucleating agent selected from the group consisting of inorganic salts and talc.

15. A rolled paper product comprising paper wound onto the starch core product of claim 1.

16. A method of preparing a biodegradable, water dispersible, expanded closed cell core product comprising extruding starch which has a particle size of from about 800 to 1200 microns in the presence of a total moisture content of about 10 to 25% by weight and at a temperature of from about 100 to 25° C.

17. The method of claim 16 wherein the starch is selected from the group consisting of corn, potato, wheat, tapioca, waxy maize and high amylose corn.

18. The method of claim 16 wherein the starch has an amylose content of at least 40% based on the weight of starch.

19. The method of claim 18 wherein the starch is a modified starch.

20. The method of claim 19 wherein the starch is modified with 2 to 15% by weight of alkylene oxide containing 2 to 6 carbon atoms.

21. The method of claim 20 wherein the starch has an amylose content of at least 65% based on the weight of starch.

22. The method of claim 21 wherein the starch contains 1 to 8% of a nucleating agent selected from the group consisting of inorganic salts and talc and has a particle size of from about 800 to 1200 microns.

\* \* \* \* \*